United States Patent
Ose et al.

(10) Patent No.: US 7,812,288 B2
(45) Date of Patent: Oct. 12, 2010

(54) SENSOR DEVICE FOR A HEATING DEVICE

(75) Inventors: Lutz Ose, Sternenfels (DE); Martin Baier, Ettlingen (DE); Wolfgang Wittenhagen, Bretten (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 264 days.

(21) Appl. No.: 11/960,848

(22) Filed: Dec. 20, 2007

(65) Prior Publication Data

US 2008/0093355 A1    Apr. 24, 2008

Related U.S. Application Data

(63) Continuation of application No. PCT/EP2006/005893, filed on Jun. 20, 2006.

(30) Foreign Application Priority Data

Jun. 22, 2005 (DE) .............. 10 2005 030 555

(51) Int. Cl.
    *H05B 3/68* (2006.01)
(52) U.S. Cl. .............. 219/448.13; 219/446.1; 219/448.11; 219/494
(58) Field of Classification Search ......... 219/490–484, 219/482, 493, 446.1, 447.1, 448.11, 448.12, 219/448.13
    See application file for complete search history.

(56) References Cited

U.S. PATENT DOCUMENTS

| | | | |
|---|---|---|---|
| 3,710,076 A | 1/1973 | Frazier | |
| 4,243,874 A | 1/1981 | Fischer | |
| 4,414,465 A | 11/1983 | Newton et al. | |
| 5,037,488 A | 8/1991 | Wienand | |
| 5,694,107 A | 12/1997 | Moriwake et al. | |
| 6,232,618 B1 | 5/2001 | Wienand et al. | |
| 6,272,735 B1 | 8/2001 | Moriwake et al. | |
| 6,462,316 B1 * | 10/2002 | Berkcan et al. | 219/502 |
| 6,483,084 B2 | 11/2002 | Petri et al. | |
| 6,930,287 B2 * | 8/2005 | Gerola et al. | 219/447.1 |
| 6,940,048 B2 * | 9/2005 | Wilkins | 219/448.13 |

(Continued)

FOREIGN PATENT DOCUMENTS

DE    3736005    5/1989

(Continued)

OTHER PUBLICATIONS

International Search Report from PCT/EP2006/005893 dated Dec. 6, 2006.

(Continued)

*Primary Examiner*—Mark H Paschall
(74) *Attorney, Agent, or Firm*—Alston & Bird LLP

(57) ABSTRACT

A sensor for a sensor device on a cooking hob is provided with contacts on a support, an electronic circuit for signal processing and a resistance track for temperature measurement. The sensor is arranged in a tubular metallic housing above a radiant heater of the cooking hob. The metallic housing is operated as an electromagnetic pan recognition sensor. The functions of temperature measurement and pan recognition can be combined in one sensor device as a module. A good transmission of sensor signals can be achieved as a result of the physical proximity of the sensor signal processor to the sensor by placing them on the same support.

30 Claims, 2 Drawing Sheets

U.S. PATENT DOCUMENTS

| | | |
|---|---|---|
| 2002/0011480 A1 | 1/2002 | Schilling et al. |
| 2003/0010769 A1 | 1/2003 | Wilde et al. |
| 2004/0164067 A1* | 8/2004 | Badami et al. ............. 219/494 |
| 2005/0115949 A1 | 6/2005 | McWilliams |
| 2006/0289460 A1* | 12/2006 | Thimm et al. ............... 219/497 |

FOREIGN PATENT DOCUMENTS

| | | |
|---|---|---|
| DE | 19526091 | 1/1997 |
| DE | 10337543 | 2/2005 |
| EP | 0933626 | 8/1999 |

OTHER PUBLICATIONS

German Search Report from German Application No. 10 2005 030 555.5.

* cited by examiner

SENSOR DEVICE FOR A HEATING DEVICE

CROSS REFERENCE TO RELATED APPLICATIONS

This application is a continuation of PCT/EP2006/005893, filed Jun. 20, 2006, which in turn claims priority to DE 10 2005 030 555.5, filed on Jun. 22, 2005, the contents of both of which are incorporated by reference.

FIELD OF THE INVENTION

The invention relates to a sensor device with sensor signal processing for a heating device under a cover, such as used, for example, with a radiant heater under a glass ceramic hob on which stands a saucepan with its content and which is to be heated.

BACKGROUND OF THE INVENTION

It is known from WO 99/34178 to apply a temperature sensor as a platinum precision resistor to a ceramic substrate. It is also known from EP 933 626 A2 to apply a sensor to a support forming at least part of an envelope for the sensor. The function of said envelope is to protect the sensor.

It is known from EP 1 215 940 A2 to provide an electromechanical excess temperature protection in tubular form with thermal expansion on a radiant heater below a glass ceramic hob. It passes over at least part of the heating surface and prevents the underside of the glass ceramic hob from becoming too hot.

It is known from WO 03/081952 A1 to construct a temperature sensor for determining the temperature of a glass ceramic hob as a resistance track on a support, the latter passing over a radiant heater. In order to avoid the determination of the glass ceramic hob temperature being influenced by the temperature resulting through the radiant heater a downward thermal insulation or shielding is provided.

It is also known to place the aforementioned sensors in a radiant heater and connect the same by electrical conductors to an evaluation electronics. As a result of the numerous conductors, their length and position, as well as the small sensor signals a reliable evaluation is difficult, costly and fault-prone. Therefore, there is a need to provide a sensor device that avoids the disadvantages of the prior art and in which in particular several functions of a sensor device can be combined in limited space.

SUMMARY

In one embodiment, a sensor device comprising a support surface has a first end and a second end, and a tubular shaped, elongated sensor housing, wherein said first end of said support surface is located within said sensor housing and a second end of said support surface is located outside said sensor housing, said sensor device further comprising a temperature sensor comprising a temperature dependent material formed in a loop configuration on said support surface, wherein said at least a portion of said loop is within said sensor housing, an electromagnetic sensor, wherein and said sensor housing forms said electromagnetic sensor, and a sensor signal processor positioned on said support surface, said sensor signal processor electrically connected to said temperature sensor.

BRIEF DESCRIPTION OF THE DRAWINGS

Embodiments of the invention are described in greater detail hereinafter and are diagrammatically shown in the drawings, wherein.

DETAILED DESCRIPTION OF THE EMBODIMENTS

Figure 1:
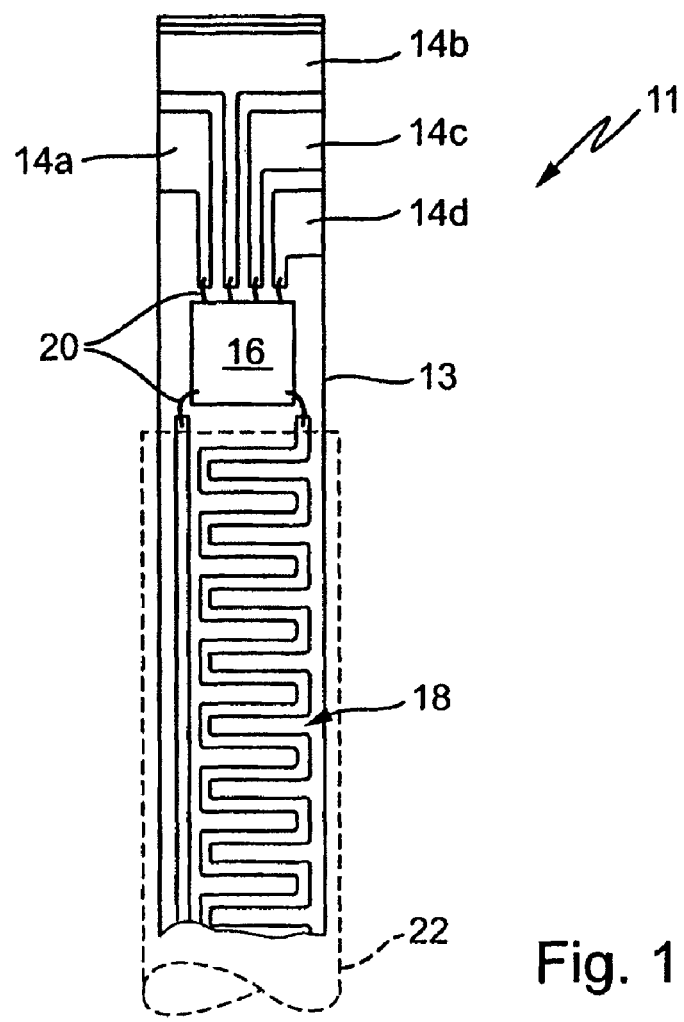
FIG. 1 illustrates a plan view of one embodiment of a sensor device with contact surfaces, a circuit and a resistance track on a support.

This problem is solved in one embodiment by a sensor device having the features of claim 1. Advantageous or preferred developments of the invention form the subject matter of the further claims and are explained in greater detail hereinafter. By express reference the wording of the claims is made into part of the content of the description.

According to an embodiment of the invention, the sensor device has a sensor housing in which, particularly for its protection, the temperature sensor is placed between the heating device and the cover. The sensor device also has an electromagnetically or inductively measuring sensor, which can fulfil various functions, as will be explained hereinafter. The sensor housing is at least used as part of the electromagnetic sensor. Thus, the sensor housing can fulfil a double function, namely, protecting the temperature sensor and a sensor element for the electromagnetic sensor. Signal processing for the sensor device (or the sensor or sensors or electronic sensor signal processing) is close, or even very close, to at least one sensor or the temperature sensor. Advantageously the spacing is only a few centimetres, so that measurement invalidations can be minimized. In particular, as a result of the short signal path, interference in some cases due to weak electrically measured signals is reduced. The main function of sensor signal processing is to so process the pure sensor signals so that they can be transmitted in a fail-safe manner to the evaluation electronics (controller) of the electrical appliance even over relatively long distances.

The temperature sensor is advantageously constructed for protecting a cover, particularly a glass ceramic hob, against overheating. For example, for glass ceramic hobs, a maximum temperature of around 600° C. at the surface should not be exceeded.

The sensor signal processing means preferably has an electronic integrated circuit (IC). So as to preferably only have a single circuit, it can be constructed as an ASIC (Application Specific Integrated Circuit). It is constructed, in a particularly preferred manner, using SOI technology (Silicon-On-Insulator). Circuits in accordance with this technology are suitable for operation at ambient temperatures of 250° C. As a result of potential temperature problems, a chip housing can be omitted or an unhoused circuit can be used, for example as a so-called die, i.e. as a semiconductor material wafer. It is also possible to use a thermally stable housing, for example a ceramic housing, for better chip handling.

Advantageously, the sensor signal processing means is constructed for troublefree analog and/or digital transfer to an evaluation unit or appliance control (controller) or the like of the electrical appliance. This can be achieved by a close spatial proximity of the sensor signal processing means to the sensor.

The sensor signal processing means can be connected via a serial bus to an evaluation unit. Advantageously, the serial bus is constructed for the transmission of data in a simplex, half-duplex, duplex or full duplex method. It can also be constructed as a synchronous or asynchronous bus. In the case of a synchronous bus, preferably the clock line also functions as a system clock for sensor signal processing.

In another embodiment of the invention, the power supply for the sensor signal processing means can come from the data bus.

Advantageously, the sensor signal processing means or a corresponding component for the sensor device or the sensors, can be placed in the sensor housing. Thus, it can also be protected and the spacings or signal paths can be kept as short as possible.

In particularly advantageous manner, the aforementioned sensor signal processing means of the sensor device or for the temperature sensor can be fitted to the sensor system support. This facilitates a spatial proximity and electrical connection. As a result of the special design of the sensor, the sensor signal processing means can be located outside, but still close to the heating device.

On the support can be provided contact surfaces or the like by means of which the sensor signal processing means, following the application thereof to the support, can be connected to the sensors, particularly the temperature sensor and/or the electromagnetic sensor. This preferably takes place by means of wire bonds. On the support can also be provided further contact surfaces for the connection of further sensors to the sensor signal processing means, particularly further temperature sensors. These further sensors can be placed on another support, but in certain circumstances, in the same housing. Further components can also be fastened to the support by soldering, conductive adhesive or welding processes.

The electromagnetic or inductive sensor can, according to a further development of the invention, be a saucepan recognition sensor enabling the establishment of a saucepan's (cooking container) presence, the saucepan size and/or the magnetic properties of the bottom of the saucepan on the cover. Through a recognition of the saucepan, saucepan size and/or saucepan position, it is possible to ensure that the heating device can be operated if no or a false saucepan is located above it. This is desirable for reasons of safety and power saving.

According to another embodiment of the invention, the electromagnetic sensor can be used for determining the temperature of the saucepan to be heated which is standing on the cover. The saucepan bottom temperature can be measured by establishing its varying physical characteristics. The permeability and electrical conductivity detected changes with the saucepan temperature.

Advantageously, the sensor housing is elongated, particularly in tube form. It can be electrically conductive; advantageously, a metal tube can be used. In a further development of the invention, it is possible to provide openings or slots on that side of the sensor housing which faces the cover. This makes it possible to vary the sensitivity of the temperature determination on the cover through the temperature sensor. Alternatively to the openings, the sensor housing wall thickness in this area can be made thinner.

Another possibility involves the sensor housing, particularly when it is a tube with a circular basic shape, to be flattened or straight on the side directed towards the cover. As a result, the sensor housing and consequently also the temperature sensor therein can be even closer to the cover. Alternatively, an angular profile can be provided for the sensor housing, for example a triangular or quadrangular profile.

The sensor housing should have a certain length, so that it extends from the edge of the heating device to at least a central area of said heating device. It is advantageously substantially straight or rod-like. The sensor housing can project over and beyond the central area, particularly to the other side, especially if the sensor housing is simultaneously used as an inductive sensor. If the heating device is subdivided into several areas, which can be independently controlled, the sensor housing advantageously at least partly projects over each of said heating areas. The construction of a curved sensor housing is also possible, particularly in the form of a pitch circle or even a whole circle, in the manner of a single-turn loop.

In another embodiment, in which the sensor housing can be used as an inductive sensor, the sensor housing extends from one to the other edge of the heating device, where it can be electrically connected to parts of said device.

It is also possible for the temperature sensor to be located on the marginal area or outside the central area of the heater, i.e., eccentrically. Preferably, this takes place on the side, especially if the heating device only has one heating area.

In a further embodiment of the invention, it is possible to subdivide the temperature sensor into two or more areas and provide two or more temperature sensors. This multiple implementation has the advantage that different areas of the heating device can be provided with an independent temperature sensor or at least an individual area of the temperature sensor. Thus, different areas of the heating device can be monitored separately or independently of one another. The heating device can be subdivided into several heating areas, which are separately controllable. With each heating area, there is associated at least one independent temperature sensor or an area measured by such a sensor. The association advantageously takes place through close spatial arrangement, particularly between the heating area and a cover. Temperature sensors can also be positioned outside the heating area, for example, on a holder or a reception disk for the heating device.

For evaluation purposes, the areas of the temperature sensor or individual temperature sensors can be wired as a measuring bridge. This makes it possible to precisely evaluate minor differences in the resistance and therefore also in the temperature. For the temperature sensor, temperature-dependent materials, which are suitable for the temperature range can be used. Advantageously, platinum is used for the temperature sensor material. According to requirements, the sensor can project to a varying extent over the heater surface or also cover a larger heater surface area.

With regards to the construction of a temperature sensor, it can be placed on a support, which is advantageously a ceramic support. The sensor can be, for example, applied to the support in thin or thick film technology. It can at least partly run in meander-like or loop manner so as to achieve a greater length on a restricted surface. In addition to the temperature sensor, the support can also have contact surfaces for a connection to an evaluating or control device. These contact surfaces can be constructed in such a way that they can be contacted with several contact springs by plugging into a holder.

The support can also be placed on a further holder or in a housing of insulating material. Steatite is a suitable example as the ceramic material. It is also possible for the aforementioned contact surfaces to cooperate with electrical terminals on the holder or housing, particularly through a contact occurring during assembly. It is also advantageous for the signal processing means of the sensor device to be placed on the holder or in a housing. As a result, the signal paths are short and it is possible to produce the sensor device as a module emitting a signal that can easily be processed.

The holder or housing can be constructed in such a way that they can be fitted relatively easily to a heating device or a holder for the same. To this end a releasable fastening can be provided, for example by clamping, screw fastening or mounting with rotary fastening members.

These and further features can be gathered from the claims, description and drawings and the individual features, both singly or in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

Turning now to the figures, FIG. 1 shows a sensor 11 formed on a support 13. The sensor has four contact surfaces 14a-d, an electronic circuit 16 as a sensor signal processing means and a resistance track 18. The contact surfaces 14 of standard material are applied to the support 13, which can be a ceramic substrate. By means of wire bonds 20 the electronic circuit 16 is electrically conductively connected to the contact surfaces 14 and the resistance track 18. Circuit 16 or the sensor signal processing means can also be implemented without a typical housing for IC's or the like and can be applied directly to the support 13.

To the left the resistance track 18 has a linear supply and to the right a meander-like return path in order to produce a maximum overall length. The resistance track 18, which functions as a temperature sensor, is constructed as a conventional temperature sensor by means of resistance measurement. It can be, for example, made from platinum with different initial resistances, particularly with a Pt-1000 characteristic. This material is also applied in conventional manner to support 13, for example by thin or thick film technology.

A tubular housing 22 is shown in broken line form and in it is located support 13. By means of the contact surfaces 14 projecting from housing 22, for example, using clip contacts, soldering or welding of bonding leads, an electrical contacting of sensor 11 or sensor signal processing means 16 to the control or evaluating means or a hob control device and possibly further sensors takes place.

Figure 2:
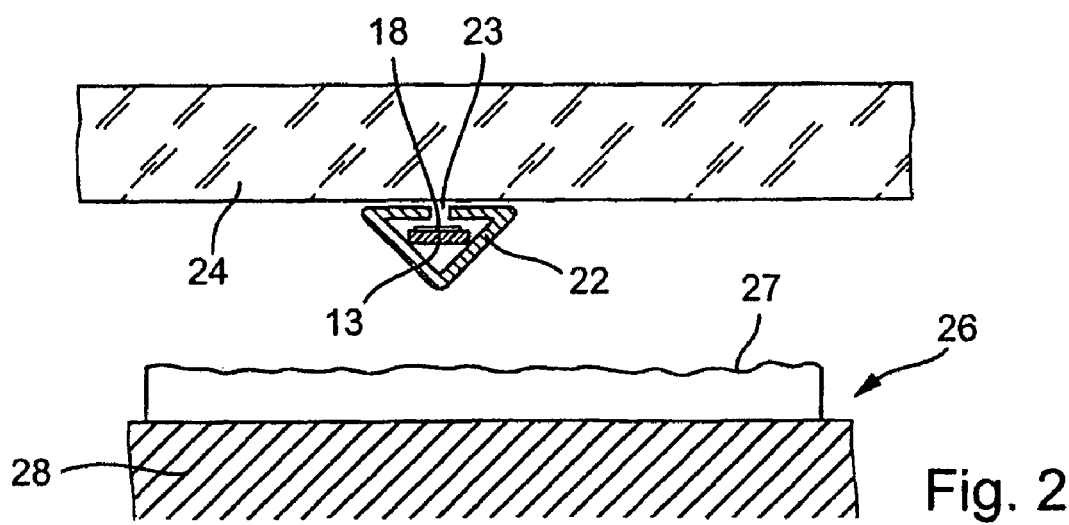
FIG. 2 illustrates a section through a tubular sensor housing over a radiant heater below a glass ceramic hob, the sensor device according to FIG. 1 being placed in the tube.

FIG. 2 shows how the housing 22 is placed below a glass ceramic hob 24 and above a radiant heater 26 comprising heating conductors 27 and heating conductor supports 28. It can be seen that the tubular housing 22 has a triangular cross-section. This makes it possible to place the sensor 11 located therein with the upwardly pointing resistance track 18 as close as possible to the underside of the glass ceramic hob 24. In the case of a sensor housing with a circular cross section, the spacing would necessarily be greater due to the rounding effect.

It can also be seen how on the top of housing 22 there is a slot 23. The latter can either extend over the entire length or alternatively can be interrupted by connecting webs in order to maintain the mechanical cohesion of the housing 22. The advantage of slot 23 is that heat radiation from the glass ceramic hob 24 passes in the downwards direction and directly strike the sensor 11 allowing temperature measurement of the glass ceramic. Thus, there is no insulating effect or delay as a result of an interposed housing wall. The underside of the housing 22 also protects the sensor 11 or resistance track 18 as a temperature sensor from the direct heat radiation of heating conductors 27.

Figure 3:
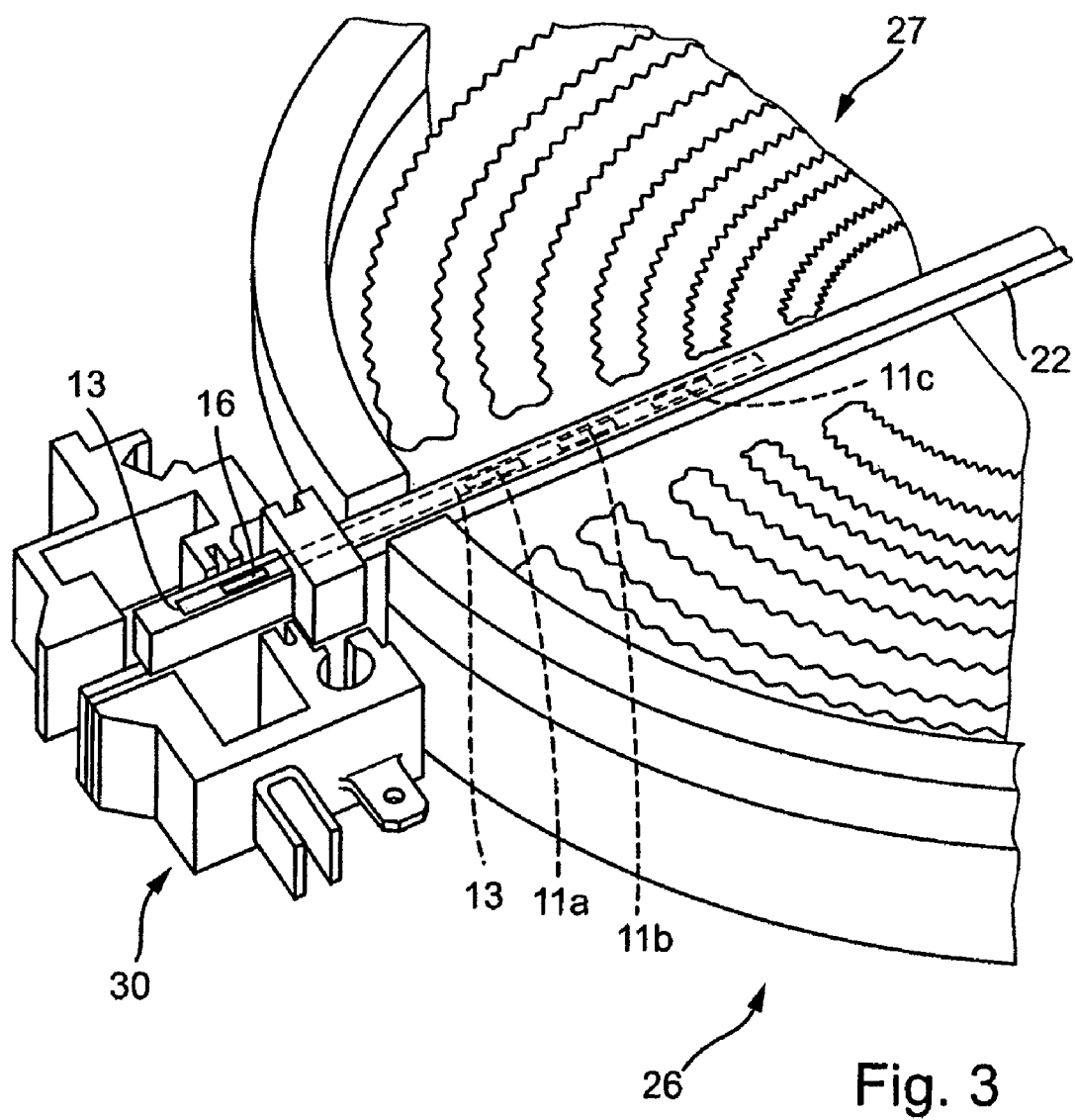
FIG. 3 illustrates an inclined view of a radiant heater, on which is laterally provided a holder with an elongated, tubular sensor housing extending over the heating surface.

According to an alternative embodiment the invention, FIG. 3 shows a disk-like radiant heater 26 to whose edge is fitted a holder 30. The latter has contact tags for the electrical connection of heating conductors 27. Moreover, fitted to holder 30 is the tubular housing 22, which extends over and beyond the centre of radiant heater 26 and projects over the heating conductors 27 or a heating surface formed by them.

On a support 13 shown in broken line form, three broken line-represented temperature sensors 11a to 11c, which are spaced apart from one another, are located in housing 22. This makes it possible to monitor different areas of the glass ceramic hob 24 positioned above the same. Electric leads to the temperature sensors 11 in housing 22 run to the holder 30. In holder 30 is diagrammatically represented the sensor signal processing means 16, which evaluates the signals of sensors 11a to 11c and transfers the same to a control device for the radiant heater 26. The holder 30 can be constructed in such a way as is presently used for so-called rod controllers, which are used as an excess temperature production for the glass ceramic in radiant heaters.

The housing 22 can also be used as a so-called saucepan recognition sensor and for this purpose should be electrically conductive, particularly in metal tube form. Such a straight saucepan recognition sensor is known from DE 101 35 270 A1 to which express incorporation by reference is made in this connection. Sensors 11 and housing 22 in conjunction with a suitable control device or sensor signal processing means, for example in circuit 16, form the inventive sensor device. It is alternatively possible to construct on a single, long support several electrically and spatially separated temperature sensors, which are spatially distributed in the manner of the temperature sensors 11a to 11c shown in FIG. 3. Thus, a single support can be provided with a single circuit or a single sensor signal processing means 16 and several temperature sensors, the support largely running in the housing 22 and the part of the support 13 with the processing means 16 is located in holder 30. Thus, the sensor signal processing means 16 is protected against overheating and is simultaneously relatively close to the sensors 11.

As a result of the offset sensors and the local temperature measurement made possible by this, in the case of both constructions, it is possible to establish local temperature increases on the glass ceramic at a number of points, and to avoid the same by switching off heater 26. As a result of the temperature decrease on the glass ceramic through the saucepan standing thereon it is possible to recognize the saucepan position or size by the general covering of a point by said saucepan. Thus, if the temperature at sensor 11a rapidly and sharply rises, but this takes place more slowly at sensors 11b and 11c, it can be concluded that there is no saucepan above sensor 11a decreasing the heat produced by heater 26 with respect to glass ceramic 24. If this corresponds to an undesired operating state, this can either be notified to a user or the heater 26 can be switched off. Alternatively, on subdividing the heating conductor 27 into several cooking zones, in each case, the covered cooking zone can be activated and an uncovered cooking zone deactivated.

Selective activation/deactivation is also possible if the sensor 11 or support 13 (and therefore the resistance track 18 applied thereto) are very long and essentially cover the entire surface of heating conductor 27. Thus, there can be an integral temperature measurement via radiant heater 26. Moreover, it is possible to make such a measured area much smaller than the entire heating surface, for example only extending over a few centimetres.

Thus, in an embodiment of the invention, it is possible to provide a sensor, which has on a support contacts, an electronic circuit as the sensor signal processing means and a temperature-dependent resistance track for temperature measurement. Said sensor or support is placed in a tubular housing over a radiant heater. The housing is used as an electromagnetically functioning saucepan recognition sensor, so that the functions temperature measurement and/or saucepan recognition can be combined in a particularly advantageous sensor device. Through the provision of the sensor signal processing means close to the sensor, it is possible to bring about an easier and less fault-prone transmission of the previously processed sensor signals.

The invention claimed is:

1. A sensor device comprising:
   a support surface having a first end and a second end;
   a tubular shaped, elongated sensor housing, wherein said first end of said support surface is located within said sensor housing and a second end of said support surface is located outside said sensor housing;
   a temperature sensor comprising a temperature dependent material formed in a loop configuration on said support surface, wherein said at least a portion of said loop is within said sensor housing;
   an electromagnetic sensor, wherein and said sensor housing forms said electromagnetic sensor; and
   a sensor signal processor positioned on said support surface, said sensor signal processor electrically connected to said temperature sensor.

2. The sensor device according to claim 1, wherein said sensor signal processor is positioned no more than a distance of a few centimeters from said temperature sensor.

3. The sensor device according to claim 1, wherein said sensor device is formed as a module.

4. The sensor device according to claim 3, wherein said sensor signal processor is located outside said sensor housing.

5. The sensor device according to claim 1, wherein said sensor signal processor is located at said second end of said support surface, such that said signal process is located outside said sensor housing.

6. The sensor device according to claim 1, wherein on said support surface are provided contact surfaces and said sensor signal processor is connected to said contact surfaces.

7. The sensor device according to claim 6, wherein said sensor signal processor is also connected to said electromagnetic sensor.

8. The sensor device according to claim 6, wherein on said support are provided contact surfaces for connection to an external appliance control or for connection to a least a further sensor to said sensor signal processor.

9. The sensor device according to claim 1, wherein on said support are provided further components for connection to said sensor signal processor.

10. The sensor device according to claim 1, wherein said sensor signal processor comprises an electronic circuit constructed using silicon-on-insulator technology.

11. The sensor device according to claim 1, wherein said sensor signal processor is configured for digital transfer of said sensor signals to a control unit of said hob.

12. The sensor device according to claim 11, wherein said sensor signal processor is configured to be connected via a serial bus to said control unit and wherein said serial bus is constructed for transmission of data in a simplex, half-simplex, duplex or full duplex manner.

13. The sensor device according to claim 11, wherein said sensor signal processor is configured to be connected via a serial bus to said control unit and wherein said serial bus is constructed as either a synchronous or asynchronous bus.

14. The sensor device according to claim 13, wherein said serial bus is constructed as a synchronous bus and wherein a clock line of said bus also functions as a system clock for said sensor signal processor.

15. The sensor device according to claim 11, wherein a power to said sensor signal processor is supplied via said data bus.

16. The sensor device according to claim 1, wherein said sensor signal processor is configured to use said temperature sensor for recognizing a size or position of a cooking container.

17. The sensor device according to claim 1, wherein said temperature sensor is configured to be used for determining a temperature of a cooking container located on said cover by determining a relative magnetic permeability of a bottom of said container and determining a specific electrical resistance of said container.

18. The sensor device according to claim 1, wherein said sensor housing is an electrically conductive tube, and a portion of said tube has openings for allowing introduction of heat to said temperature sensor.

19. The sensor device according to claim 18, wherein at least on said portion of said tube has a flattened portion and is constructed as a tube with an angular cross sectional profile.

20. The sensor device according to claim 1, wherein said sensor housing is elongated and extends at least to a central area of said heating device.

21. The sensor device according to claim 1, wherein said temperature sensor is positioned eccentrically to a central area of said heating device.

22. The sensor device according to claim 1, wherein said temperature sensor device comprises at least two single temperature sensors, wherein said at least two temperature sensors are in each case associated with different portions of said support surface.

23. The sensor device according to claim 22, wherein said heating device is subdivided into several separately controllable heating areas and with each heating area is associated at least one said single temperature sensor of said sensor device being closely spatially positioned thereto.

24. The sensor device according to claim 1, further comprising a second temperature sensor located on said support surface and further located within said sensor housing.

25. The sensor device according to claim 1, wherein said temperature sensor has a temperature coefficient of platinum with a Pt100 or Pt1000 characteristic.

26. The sensor device according to claim 1, wherein one said temperature sensor is a thin film placed on a ceramic support surface.

27. The sensor device according to claim 1, wherein electrical terminals are provided, which are located on a holder or an insulating material housing, wherein said sensor signal processor is placed on said holder or said housing, wherein said holder or said housing are constructed for fitting in a releasable fastening manner to said heating device.

28. A heating appliance comprising:
   a cover comprising a hob plate with a top surface and a bottom surface, wherein said cover is configured to receive a cooking vessel on said top surface for heating;
   a radiant heater positioned beneath said bottom surface of said hob plate; and
   a sensor device positioned between said radiant heater and said cover, wherein said sensor device comprises:
      a support surface,
      a temperature sensor formed in a loop configuration on said support surface,
      a sensor signal processor located on said support surface, wherein said sensor signal processor is electrically connected to said temperature sensor; and
      a sensor housing comprising an linear tubular shaped structure into which a portion of said support surface is located, such that at least a portion of the temperature sensor is within said sensor housing.

29. The heating appliance of claim 28 wherein said radiant heater is circular in shape and said sensor device is radially positioned with respect to said radiant heater and linearly extends from a perimeter of said radiant heater to at least a center point.

30. The heating appliance of claim 28 wherein said sensor device comprises a plurality of temperature sensors, wherein each temperature sensor detects temperature of a different area and each area is associated with a separately controllable heating area.

* * * * *